Feb. 21, 1950         W. J. GRACE         2,498,036
TRANSMISSION
Filed April 15, 1946                                2 Sheets-Sheet 1
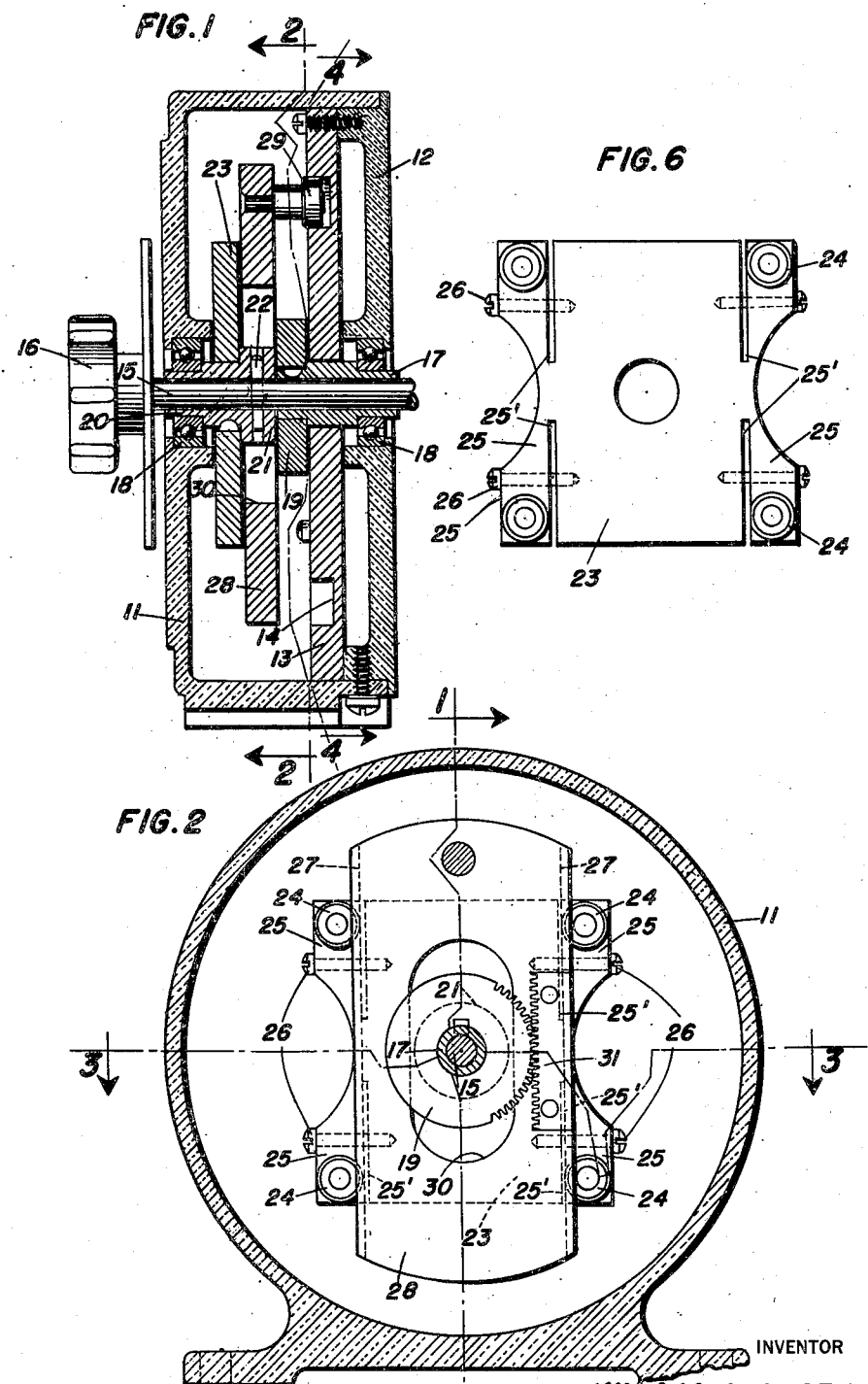
INVENTOR
WILLIAM J. GRACE
BY
ATTORNEY Feb. 21, 1950 W. J. GRACE 2,498,036
TRANSMISSION Filed April 15, 1946 2 Sheets-Sheet 2

INVENTOR
WILLIAM J. GRACE
BY
ATTORNEY

Patented Feb. 21, 1950

2,498,036

UNITED STATES PATENT OFFICE 2,498,036

TRANSMISSION

William J. Grace, Silver Spring, Md., assignor to the United States of America as represented by the Secretary of the Navy Application April 15, 1946, Serial No. 662,300

1 Claim. (Cl. 74—393)

The present invention relates to an improved transmission designed preferably for manual operation, but not limited thereto, and capable of yielding variable angular increments of displacement of its output shaft in response to constant angular increments of displacement of its input shaft. Similarly, the output shaft of the transmission of the present invention will rotate at variable angular velocities in response to any constant angular rotation of the input shaft. Thus, it is evident that my transmission may be employed to advantage in many situations where an adjustment dial having uniformly spaced graduations is desired, to enable an operator to make output adjustments in non-uniform angular steps by rotation of the dial through constant angular steps. For example, a transmission made in accordance with the present invention may be combined with a variable-ratio auto transformer, of the shaft-operated type, such as the VARIAC, utilizing the manually operated input shaft of the transmission to adjust the output shaft the latter being connected mechanically to the transformer shaft to adjust the latter to any desired angular position, the angular rotation of the output shaft differing from that of the input shaft according to a predetermined pattern.

The difference between the angular velocities of the input and output shafts, or the difference in instantaneous angular position is provided through the agency of a cam follower and track assembly which operates through rack and pinion gearing to produce and incorporate the above-mentioned difference in the position or angular velocity of the input shaft.

It will be evident that where the transmission is to be used with equipment not revolving through an entire revolution such as a potentiometer, a cam assembly employing a limited-rotation cam track can be used to confine the motion of the cam follower between any desired limits, and thus restrict the input shaft rotation. Where the transmission is to be used with continuously revolving equipment, the cam track may be continuous, making cyclic changes possible.

In the drawings,

Fig. 1 is a longitudinal sectional view of a transmission representing a preferred embodiment of my invention, taken along line 1—1 of Fig. 2.

Fig. 2 is a cross-sectional view of the transmission depicted in Fig. 1, taken along line 2—2 of Fig. 1.

Fig. 5 is an isometric phantom view of a transmission of the present invention and illustrates the manner in which it may be combined with an autotransformer or the like.

Fig. 6 is a plan view of the head member used to transmit rotary motion from the input shaft to the cam-follower.

Figure 3:
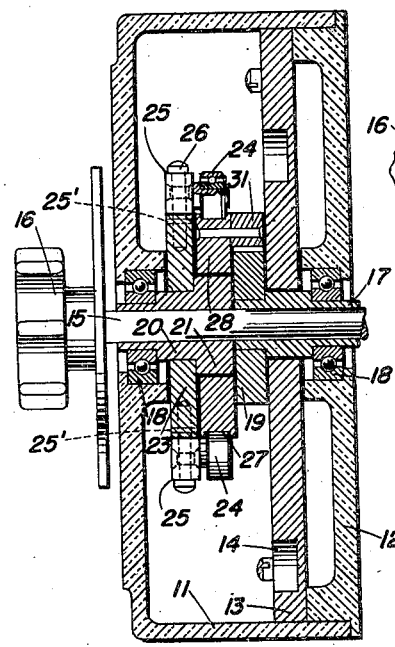
Fig. 3 is a longitudinal sectional view taken along line 3—3 of Fig. 2.
Figure 5:
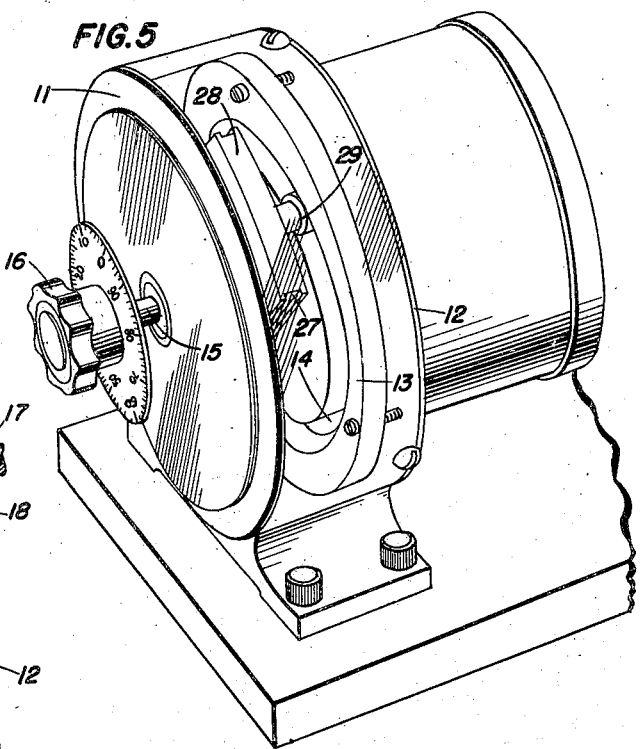

Referring now to the drawings, reference character 11 denotes a casing in which the operating parts are enclosed and which is closed at one end by a cover member 12. On the inner face of the cover member is rigidly mounted a cam plate 13 having an eccentric, not necessarily circular, groove 14 in its inner face forming a cam track.

A solid input or operating shaft 15, provided with a knob 16 for manual operation thereof, and an output or adjusting shaft 17, are journaled in spaced main bearings 18. On the inner end of the shaft 17, which shaft extends through a center hole in the cam plate 13 and terminates within the case, is rigidly mounted a pinion 19. The input shaft 15 extends through the case and has fixed thereon a stepped hub 20 the head 21 of which is transversely bored to receive a pin 22 which rigidly secures the hub to the shaft to assure rotation of the former with the latter.

A rectangular plate or head 23 provided at each of its four corners with a ball-bearing guide roller 24 is fixed on the hub 20, the rollers being journaled on the plate 23 at diagonally arranged points about the central axis of rotation of the plate 23. The rollers 24 are mounted in pairs, in adjustable edge plates 25 defined in part by weakening cuts 25' and are movable a short distance parallel with the axes of screws 26 for close adjustment in, and frictional engagement with, two parallel tracks or guide grooves 27 in the opposite edges of a cam follower plate 28. As best seen in Fig. 2, the cam-follower plate 28 has a cam roller 29 journaled at one end thereof and is provided with a central longitudinal slot 30 which encloses the head 21 of the drive hub 20 to permit oscillation or reciprocation of the cam-follower across the central axis as the cam roller 29 follows the cam groove 14.

The cam-follower plate 28 transmits motion to the pinion 19 through a toothed member 31, here shown as a rack-bar, rigidly secured to one face of the cam-follower plate 28 and constantly engaged with the pinion. The movement of the follower is stabilized and guided, as it revolves and oscillates, by means of the four rollers 24 which frictionally engage the follower to traverse the grooves 27.

Figure 4:
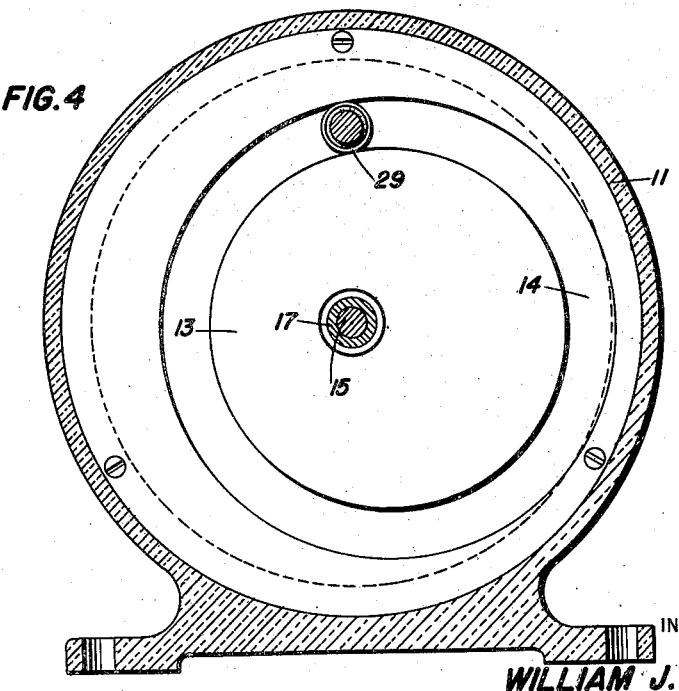
Fig. 4 is a cross-sectional view taken along line 4—4 of Fig. 1 and illustrates the relation of the eccentric cam track to the concentrically aligned input and output shafts.

As shown in Fig. 4, the groove 14 for the cam roller 29 is a continuous loop for a cycle of 360° but it will be understood that the cam groove 14 may be shortened to a segment of any length to limit the movement of the roller to a partial cyclic movement when desirable.

While what has been described herein is illustrative of a presently preferred embodiment of my invention, it is not intended that the invention be limited thereto but that it embrace any changes and modifications which fall within the true scope of the invention, as defined in the appended claim, occurring to those skilled in the art.

I claim:

In an instrument rotatably adjustable for angular positions, the combination with an enclosing case having a fixed cam track, an input shaft having a drive head and an axially alined output shaft having a driven pinion, of a slotted follower having opposed guide grooves and reciprocable transversely of the shafts, two pairs of rollers mounted on the head in constant engagement with said grooves, a toothed rack rigid with the follower constantly meshing with the pinion, and a roller journaled on one end of the follower movable in the cam track.

WILLIAM J. GRACE.

REFERENCES CITED

The following references are of record in the file of this patent:

UNITED STATES PATENTS

| Number | Name | Date |
| --- | --- | --- |
| 58,614 | McCollough | July 20, 1897 |
| 1,180,952 | Staude | Apr. 25, 1916 |
| 1,555,254 | Proctor | Sept. 29, 1925 |
| 1,675,018 | Ausbury | June 26, 1928 |
| 1,721,408 | Perdreau | July 16, 1929 |
| 2,325,582 | Andersen | Aug. 3, 1943 |

FOREIGN PATENTS

| Number | Country | Date |
| --- | --- | --- |
| 507,552 | Germany | Sept. 17, 1930 |
| 699,477 | Germany | Nov. 29, 1940 |
| 771,899 | France | Oct. 18, 1934 |